(No Model.)
L. R. McKINNEY & W. FRENCH.
HORSE DETACHER.
No. 566,789. Patented Sept. 1, 1896.
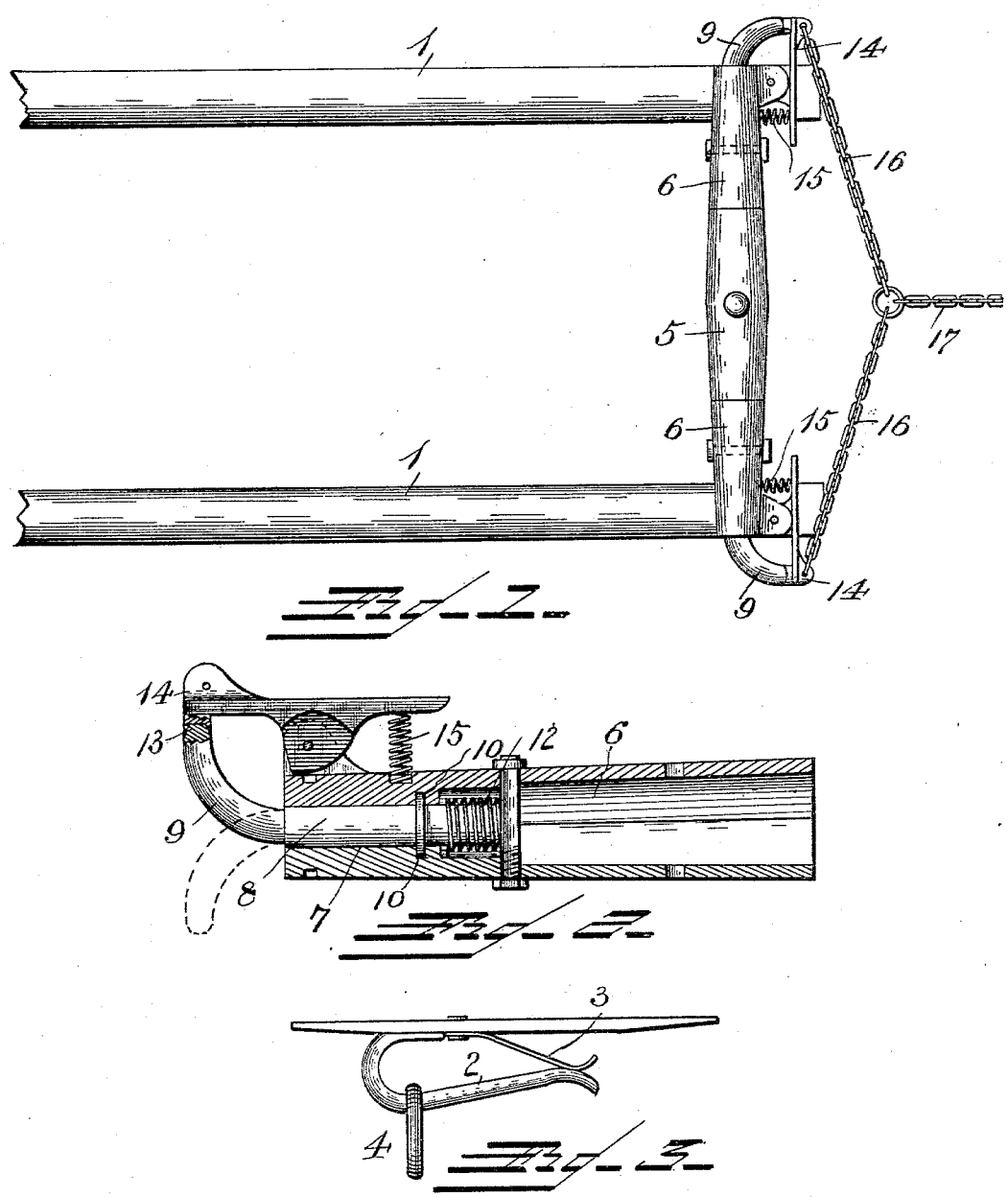
Witnesses.
F. L. Ouraud.
A. B. Smith
Inventors
Lee R. McKinney.
Wm. French.
By H. B. Willson,
Attorney.

UNITED STATES PATENT OFFICE.

LEE ROY McKINNEY AND WILLIAM FRENCH, OF HOPKINS, MISSOURI.

HORSE-DETACHER.

SPECIFICATION forming part of Letters Patent No. 566,789, dated September 1, 1896.

Application filed December 6, 1895. Serial No. 571,258. (No model.)

*To all whom it may concern:*

Be it known that we, LEE ROY McKINNEY and WILLIAM FRENCH, citizens of the United States, residing at Hopkins, in the county of Nodaway and State of Missouri, have invented certain new and useful Improvements in Safety Singletrees and Holdbacks for Vehicles; and we do declare the following to be a full, clear, and exact description of the invention, such as will enable others skilled in the art to which it appertains to make and use the same.

Our invention relates to improvements in safety singletrees and holdbacks for vehicles, so that in case of a runaway the traces can be detached from the singletrees and the holdback-straps disengaged from the holdback, whereby the horse will be instantly released and accidents avoided.

The invention consists in the novel construction and combination of parts hereinafter fully described and claimed.

In the accompanying drawings, Figure 1 is a plan view of our invention. Fig. 2 is a sectional view of one end of the singletree, and Fig. 3 is a view of the holdback-hook.

In the drawings, the reference-numeral 1 designates the thills of a pair of shafts, provided on the under side with a holdback consisting of a metal plate provided with a hook 2 and a spring-tongue 3. Rings 4, secured to the holdback-strap, are adapted to engage with said hooks, and when the horse is released from the singletree, as hereinafter described, the rings will be pulled off of said hooks, so as to disengage the horse.

The numeral 5 designates the singletree, provided at each end with a ferrule 6 made in two parts and secured thereto my means of a bolt or rivet. Formed in the outer ends of said ferrules are slots 7, forming cylindrical recesses when the two parts are bolted together, in which is seated the shank 8 of a hook 9. These shanks are provided with collars 10, fitting in annular grooves in the ferrules, so as to hold the hooks in place therein. Secured to said shanks and to the ferrules are coiled springs 12. The outer ends of the hooks are provided with reduced portions 13, with which engage spring-catches 14, pivoted to the said ferrules, and their inner ends provided with coiled springs 15, by which their outer ends are held in engagement with the hooks. Secured to the outer ends of said catches are chains 16, connected with a chain 17, leading to the dashboard of a vehicle and connected therewith by a snap-hook.

The operation is as follows: The traces of the harness are connected with the hooks of the singletrees and the latter then turned back, so that they will engage with the spring-catches and hold the traces on the hooks. The holdback-strap rings are then connected with the hook of the holdback. In case of a runaway the chain 17 is pulled back, which will operate the spring-catches, when the coiled springs will rotate the hooks of the ferrules, turning them round and releasing the trace-chains. The holdback-strap rings will also be pulled off of the holdback-hook, releasing the horse or horses, and thus preventing accidents.

Having thus described our invention, what we claim, and desire to secure by Letters Patent, is—

The combination with the shafts, the holdbacks consisting of the metal plates and spring-tongues and the rings and holdback-straps, of the singletree, the ferrules, provided with an aperture or opening in the outer end and formed with annular grooves, the rotatable hooks, the shanks of which are journaled in said openings and provided with collars engaging with said grooves, the coiled springs encircling the inner ends of said shanks, the spring-catches pivoted to lugs on the ends of the ferrules, having notches at the outer ends with which said hooks engage, the chains secured to said catches and the coiled springs interposed between the inner ends thereof and the ferrules, substantially as described.

In testimony whereof we hereunto affix our signatures in presence of two witnesses.

LEE ROY McKINNEY.
            WILLIAM FRENCH.

Witnesses:
   L. M. HEWETT,
   I. N. STRAWN.